UNITED STATES PATENT OFFICE.

GEORGE R. CHATFIELD, OF GLEN RIDGE, NEW JERSEY.

SHORTENING COMPOSITION AND METHOD OF MAKING SAME.

1,368,022.  Specification of Letters Patent.  Patented Feb. 8, 1921.

No Drawing. Continuation of application Serial No. 205,339, abandoned, filed December 4, 1917. This application filed May 25, 1918. Serial No. 236,545.

*To all whom it may concern:*

Be it known that I, GEORGE R. CHATFIELD, a citizen of the United States, residing at Glen Ridge, in the county of Essex and State of New Jersey, have invented certain new and useful Improvements in Shortening Compositions and Methods of Making Same, of which the following is a specification.

My invention relates to shortening compositions and methods of making same to be used as a material for shortening bread, pastry, etc., the composition additionally containing elements, in its preferred form, which serve to hasten the time of fermentation and consequent rising of the bread, and also act as a yeast food. The present application is a continuation of my applications Serial No. 147,070, filed February 7, 1917, Dry shortening compounds and yeast food, and Serial No. 205,339, filed December 4, 1917, Shortening compositions and methods of making same, containing subject-matter disclosed in both of said previous applications, and is intended to supplant both of the same.

My invention comprises a dry shortening material which may be kept in good condition for a considerable period and added to a dough batch whenever desired, in place of lard, cotton seed oil and the other oily or fatty materials which are commonly used for shortening. Among the advantages of my improved product may be mentioned economy in the cost of shortening material and the preparation of bread and the production of a loaf of a distinctly superior character, as well as the advantage of the excellent keeping qualities of the product, absence of rancidity, etc.

My product comprises a toasted or heat-treated compound, comprising a finely divided edible carrier containing a minor proportion of oily or fatty matter absorbed or adsorbed within the material, the composition having been heated to a sufficiently high temperature and for a sufficient length of time to drive off the water contained in the carrier and to partially disintegrate the carrier. Preferably, I use a porous, finely-divided meal, of which I consider the best adapted for my purpose to be corn meal. The composition, in its preferred form, also includes a considerable quantity of starch and a smaller proportion of sugar, of which corn sugar is the best adapted for the purpose, together with small proportions of flavoring and seasoning materials. Various forms of oily or fatty material may be used for incorporation with the mass. The entire composition containing a relatively small amount of added fatty material, such, for example, as approximately ten per cent., apparently acts as a shortening material in the dough batch with the result that I secure with my improved composition the same shortening properties in baking bread as can be obtained with from twenty to twenty-five times as much of the same oily or fatty matter used alone. The methods of forming the material and the functions of the various ingredients will now be described.

The amount of oily or fatty matter commonly employed in the manufacture of bread, pastry, etc. varies with the article to be produced. In making bread, prior to the wartime regulations of 1917, about five pounds of lard per barrel of flour or equivalent were employed, while in making pie-crust, the proportion of lard to flour is considerably greater. This use of oily or fatty materials for shortening, as practised in commercial bakeries, and also in the household, has certain disadvantages, one being that of the mechanical difficulty of incorporating the fatty matter with the flour under the usual dough-making conditions, and another being that the fatty matter more or less impedes the action of yeast in raising the dough. Likewise, the employment of a liquid shortening agent materially cuts down the quantity of water which may be added to the dough to obtain proper results and lessens the springiness of the batch. Other disadvantages consist in the high price of edible fats, and the fact that the oily or fatty materials, when used in relatively large amounts, as for example, in the case of pastry, are found to be rather indigestible by many people.

With the present invention, I find that about two or two and one-half pounds of the composition containing say ten per cent. of added oily or fatty material will produce the same shortening effect as five pounds of lard or the like. That is to say, the composition, usually comprising corn meal and starch, impregnated with a minor proportion of oily or fatty material as the chief ingredients, modified by the heat treatment to which I subject the material, becomes itself an active shortening agent; and the composition may be made and sold for a less price per pound than the usual fatty or oily materials used for shortening. The baker or user of the composition is enabled to add a greater quantity of water to his mix, including my composition, than in the cases in which the usual shortening ingredients are used, to produce loaves of the desired freshness and springiness, this being, of course, a considerable commercial advantage. Furthermore, I not only avoid the oily taste of the large proportions of fatty matter which are often used, but, in the preferred form of my invention, I secure a new and desirable flavor, that of the toasted corn meal. The corn meal, when toasted or changed by the process of the present invention, has a delicate nutty flavor which, though not strong enough to obscure the taste of other and added flavors, is nevertheless distinctly palatable in and of itself, giving bread, for example, a faint flavor which is deemed desirable. This faint nutty flavor of the treated corn meal may be, and in practice usually is, accentuated in the present composition by a slight proportion of Tonka bean, or its aromatic constituent, cumarin. The small amount of oily or fatty matter contained in my composition, being all held within the material, does not have the impeding action upon the growth of yeast exercised by shortening compositions composed of, or rich in, fatty matter. I may, indeed, render my material an active aid in the fermentation of dough-making, by incorporating into it a little grape sugar (commercial dextrose) or other suitable nutrient for yeast.

In the present invention, a comparatively high temperature is used in the mixing operation, such as a temperature of from 240° to 300° F., which results in the driving off of the water content of the meal or carrier, this water being apparently replaced by the oily or fatty material. When starch is added to the composition, it serves to take up any surplus fat there may be, which is usually a very slight surface moisture on the grains of the meal, the starch distributing itself between the various grains of the meal or carrier, so that the groups of the grains of the meal are broken up and usually are entirely separated one from another. The starch thus keeps the product in a fluffy condition and reduces the possibility of the same forming into lumps, thus increasing the uniformity of the distribution of the shortening material through the dough. The starch has an additional function as a yeast food in the production of the bread, and the starch sugar or grape sugar, when used, increases this effect, being readily acted upon by the yeast and thus hastening the time of fermentation and consequent rising. The effect of the heat treatment described is to produce certain cooking changes, as a result of which the meal and starch are partially disintegrated, the product being soft and starchy to the feel, and more finely-divided than the original corn meal or carrier. The product also does not feel greasy when handled.

Corn meal, or other meal, in its natural condition does not have very good keeping qualities; it tends to spoil or change more or less in storage. This is partly due to its relations to atmospheric moisture. Like most other vegetable materials, it carries a relatively large amount of moisture in an adsorbed state; moisture in a state in which it is usually known as "water of condition." The amount of this moisture varies more or less with the condition of the atmosphere, and in damp air corn meal is apt to become physically moist or damp. In the present invention, the meal is sterilized by its exposure to a rather high temperature, and the contained moisture is driven off and is apparently replaced by the oily or fatty matter which is absorbed or adsorbed, or both, within the porous material. Meal so treated is not only substantially non-water-containing, but it likewise has very little tendency to take up moisture from the air or become damp. For the reason stated, my improved composition is a much more permanent material than the original ingredients, and may remain in storage for a period of months without deterioration.

In the performance of the described process, I ordinarily first heat the oily or fatty matter to as high a temperature as it will withstand without scorching or acquiring an undesirable taste, and then mix it, while maintaining the temperature, with the desired quantity of porous meal under vigorous agitation. As stated, corn meal is preferred, and I find that white corn meal gives better results in most instances than the yellow variety. Other porous meals, however, may be used, and some of the advantages of my invention may be obtained when other edible carriers, such as flour, are used. As soon as the meal has become impregnated with the hot fat and the water of condition of the meal has escaped as vapor, I ordinarily incorporate with the mixture a relatively considerable amount of starch, which, preferably, is corn starch. The agitation is continued under the application of the relatively high heat referred to until a substantially homogeneous mass has been formed. The starch serves to take up any excess of oily matter which has not been taken up by the meal, and it serves also in maintaining the whole mass in a dry and permanent condition, the fine starchy particles acting, in effect, to space apart and isolate the particles of meal. In the cooking, to which the whole mass is subjected, this starch is probably, to some extent, dextrinized. The starch sugar referred to may be added at the same time as the starch, but is preferably mixed with the oil before the meal is stirred therein. With this method, when the oily material is worked into the meal, the starch sugar apparently remains on the exterior of the granule for the most part. While any commercial variety of solid starch sugar or grape sugar (dextrose) may be employed, I find the hard granular varieties of starch sugar, made from corn starch, to be best adapted for the present purpose.

I find that good results are obtained when corn oil is used as the fatty or oily material, and in this case if the starch is corn starch and the grape sugar is made from corn, the whole composition is made of ordinary corn. However, of course, other starches, other oils and other varieties of grape sugar may be employed. Almost any edible oil of good quality may be employed in place of the corn oil. Thus, cotton seed oil may be used and also the various hard solid edible oils or fats, such as the commercial product known as cotton seed stearin, hydrogenated corn oil, hydrogenated cotton seed oil, or other hard normally solid oils or fats. All of these normally solid materials contain considerable proportions of stearin, and the term "stearin" as employed in the claims is intended to include these various equivalent solid fats. Also, the term "oily matter," as employed in the claims, is intended to include generically the various oily or fatty materials, either solid or liquid, which may be used in my invention, as described herein.

I find that I obtain the best results in practising my invention by stirring together the various ingredients under application of a rather high temperature, as stated, for a considerable time, such as for an hour or more, and then discontinuing the agitation and holding the materials in a heated state for a much longer period, say twenty-four hours, during which period various changes take place in the composition.

In an advantageous embodiment of the present invention, I may take a kettle-like piece of apparatus provided with powerful agitating and stirring means, and also provided with suitable heating means, such as a heating jacket. This kettle I raise to a temperature as high as the oily material will withstand without scorching. While other methods of heating may be employed, I find that in practice it is advantageous to heat by an oil jacket, using a high boiling mineral oil for this purpose. This allows me to secure a high temperature with at the same time the possibility of furnishing an ample supply of heat. An apparatus like an ordinary chocolate kettle, but provided with supplemental mixers and with means for circulating heated oil for the jacket, is suitable. A safe temperature in the kettle with most edible commercial oils and fats will range between 240° to 300° F. The more vigorous the agitating means the higher is the permissible temperature, and for this reason I ordinarily aim to provide exceptionally vigorous agitation, since the best results are obtained with as high a temperature as possible. The main object of the high temperature is to insure efficient replacement of the moisture in the meal and also in the starch by the oil.

Having the kettle and the oil at the necessary high temperature, in my preferred process, I next stir in a little solid grape sugar, say about four to six per cent. of the final composition. The agitator is placed in motion and the grape sugar thoroughly stirred into the oil. Intimate incorporation usually takes about a minute. After having incorporated the grape sugar, I next add meal, preferably corn meal of rather fine texture, such, for example, as will pass a 16-mesh sieve. Coarser or finer texture may be used, but I consider the fineness mentioned to be very suitable. I ordinarily employ white corn meal, although the yellow corn meal may be used, the color of the composition being ordinarily a little too dark however, if this is used. The corn meal is added with vigorous incorporation and the mixture soon becomes a friable mass with the oil interiorly incorporated in the corn meal granules or grains. Ordinarily, I use about two parts of oily matter for eight parts of corn meal, this making approximately ten per cent. of oily matter and forty per cent. of corn meal in the finished composition, the proportion of oily matter being the same regardless of what oily or fatty material is used.

As the hot oil is taken up by the meal, it displaces and expels the moisture of the meal which escapes as vapor. After the meal has been incorporated, and without stopping the motion of the agitating apparatus, I next add gradually a certain amount of starch, which may be corn starch, potato starch, wheat starch, etc. This is usually about forty-five per cent. of the finished composition. The agitation is ordinarily continued for some time after the last addition of starch, so that the heating referred to and agitation ordinarily continue for an hour or more. During this heating and stirring, I generally add a small proportion, such as a tenth of one per cent. of salt and powdered Tonka bean.

The process so far described produces a toasting or cooking effect on the meal and starch, but in order to produce the most beneficial results I maintain the materials in a heated condition, after discontinuing the agitation, for a considerable period, such as twenty-four hours. This may be accomplished by discharging the material, after the completion of the incorporation described above, into bags or containers capable of preventing the escape of heat to a substantial extent. During the period in which the material is retained in a heated condition, further changes take place in it; a pleasant toasted flavor is developed and there is apparently a considerable increase produced in the shortening power of the material. The material disintegrates more or less during this period, becoming considerably finer in texture. If, for example, the original meal was of such fineness as to just pass through a 16-mesh sieve, after the period of storage in a heated condition, the material will nearly all pass through a 20–22 mesh sieve.

This increase in the fineness of texture is advantageous in the use of the material, since it permits a more uniform and homogeneous admixture of the shortening composition with and through a dough mass. The slight amount of oil present being interiorly incorporated in the carrier, the material does not in any way impede the action of yeast, and likewise does not repel water as would a liquid oily material which was merely mixed with the meal.

Proportions which may suitably be used are as follows:—

| | |
|---|---|
| Oily or fatty material | 2 parts, |
| White corn meal | 8 parts, |
| Starch | 9 parts, |
| Starch sugar | 1 part, | and fractional percentages of Tonka bean and salt.

The final material obtained is a fine powder of a light golden yellow color of a consistency quite unlike that of the original corn meal. It may be described as soft and starchy in feel being neither like the original corn meal nor like flour. It is not greasy or oily in consistency, and the absence of oil on the outside surfaces of the particles decreases the likelihood of the same sticking together to form lumps. With the present composition, about two pounds of the described compound will suffice to produce the same degree of shortening as about five pounds of lard, which has heretofore been required per barrel of flour in the making of ordinary types of bread.

In making pie-crust and pastry it is usual to employ more shortening than in making bread, and in the former practice a ratio of one part of shortening to three parts of flour was common. With the present material, a high degree of shortening for such purposes may be obtained with a ratio of one part of the described compound to six parts of flour. If desired, the present material may be used in conjunction with ordinary shortening material. For example, excellent pie-crust may be made with ten parts of the present material, ten parts of lard or other usual shortening and eighty parts of flour.

For the after cooking of the material, that is the heat treatment following the agitation in the kettle, the material when in large masses may be, as stated, simply stored in heat insulated places or under circumstances precluding the loss of much heat. Being a poor conductor of heat it will retain its temperature for a long time. Or the hot material may be placed in any ordinary kiln-like device and sufficient heat supplied to make up for radiation losses. As long as the material is kept hot for a lengthy period after the first incorporation the particular devices used in accomplishing the result are not very material.

What I claim is:

1. A new shortening composition, comprising meal in partially disintegrated condition and a minor proportion of added oily matter contained within the particles of meal, the particles of meal being substantially non-water-containing and non-hygroscopic, the composition being capable of replacing, for shortening purposes, at least its own weight of oily or fatty matter.

2. A new shortening composition, comprising toasted meal and a minor proportion of added oily matter contained within the particles of the meal, said composition being a substantially non-hygroscopic fine powder, containing the oily matter in about the same relation as the water of condition of the original meal.

3. A new shortening composition, comprising a toasted mixture of meal and starch containing about ten per cent. of oily matter contained within the particles of the material, the composition containing about equal parts of meal and starch, in uniform distribution.

4. The process of producing a shortening composition, comprising, causing oily matter to be absorbed by or taken into a porous meal, at a temperature above 212° F. but not high enough to char the meal, and adding starch to the heated mixture sufficient to take up any oily matter which is not contained within the particles of the meal, and to separate said particles, and mixing the mass to obtain a homogeneous product.

5. The process of producing a shortening composition, comprising, mixing together a porous meal and a minor proportion of oily matter, and heating the mixture under vigorous agitation to a sufficient temperature and for a sufficient time to expel moisture therefrom and to impregnate the particles of meal with the oily matter.

6. The process of producing a shortening composition, comprising, mixing together a porous meal and a minor proportion of oily matter, and heating the mixture under vigorous agitation to a sufficient temperature to expel moisture therefrom, continuing the treatment until the oily matter is largely taken up by the meal and the moisture driven off, discontinuing the agitation, and maintaining the material in a heated condition for a number of hours until the material has partially disintegrated, and has become considerably finer in texture.

7. The process of producing a shortening composition, comprising incorporating a porous finely-divided meal with a minor proportion of oily matter under vigorous agitation and the application of heat of a temperature sufficient to expel moisture from the meal, stirring in a considerable proportion of starch, discontinuing the agitation, and maintaining the material in a heated condition for a number of hours, until the material has partially disintegrated and has become considerably finer in texture.

8. The process of producing a shortening composition, comprising heating about ten parts of oily matter to a temperature between 240° and 300° F., incorporating therewith under vigorous agitation first about forty parts of corn meal and then about forty-five parts of starch, and then discontinuing the agitation while maintaining the mixture in a heated condition for a number of hours, until the material has partially disintegrated and has become considerably finer in texture.

This specification signed and witnessed this 21st day of May, 1918.

GEORGE R. CHATFIELD.

Witnesses:
J. O. EDMONDS,
I. McINTOSH.